United States Patent Office 3,270,227
Patented August 30, 1966

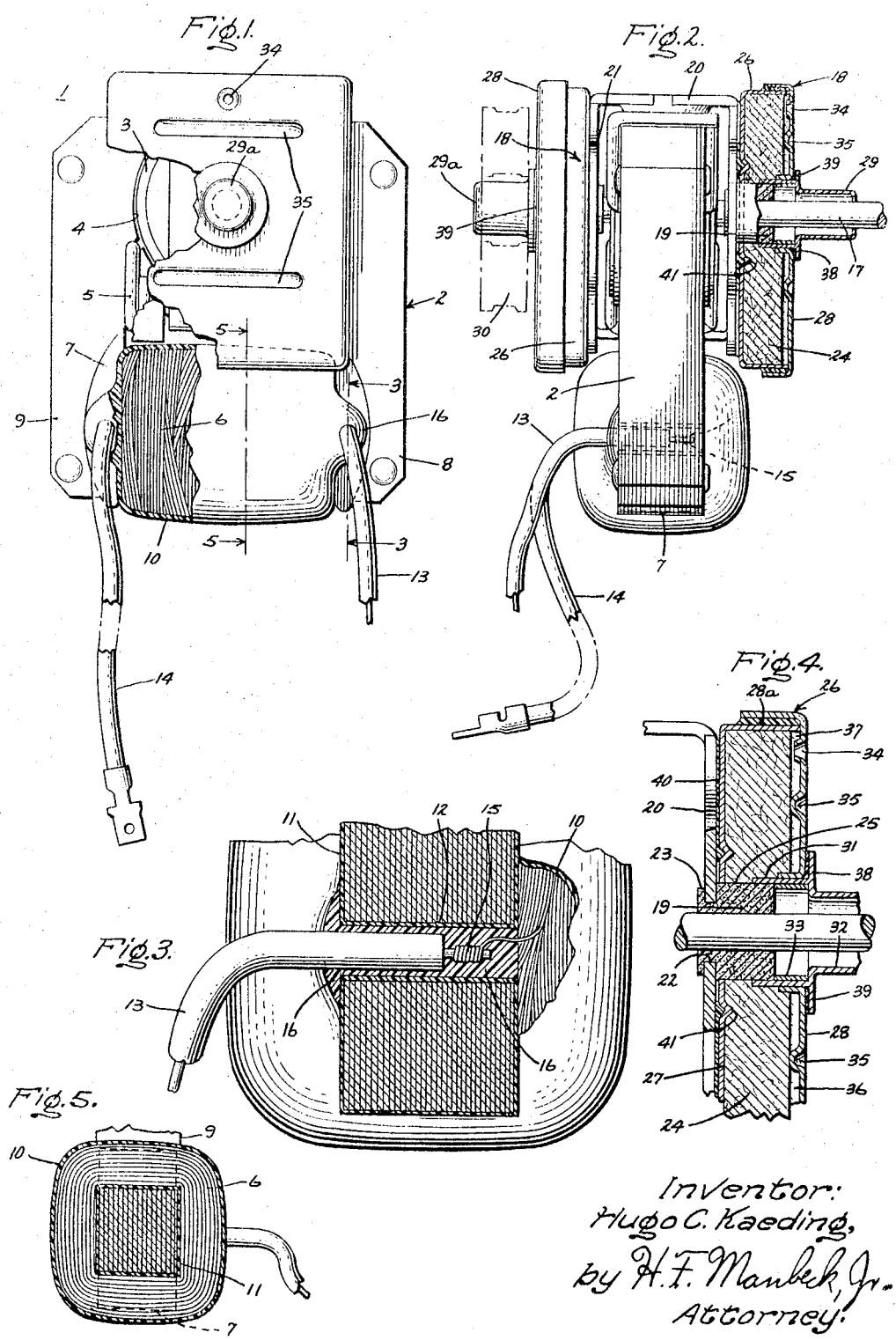

3,270,227
BEARING AND BEARING HOUSING FOR A
DYNAMOELECTRIC MACHINE
Hugo C. Kaeding, Fort Wayne, Ind., assignor to General
Electric Company, a corporation of New York
Original application Sept. 28, 1960, Ser. No. 58,954, now
Patent No. 3,196,297. Divided and this application
Aug. 17, 1964, Ser. No. 390,158
6 Claims. (Cl. 310—90)

My invention relates to dynamoelectric machines and more particularly to small motors for use in applications where enclosed electrical components are desired. This application is a division of my original application, Serial No. 58,954, filed September 28, 1960, now Patent No. 3,196,297.

In certain applications for small electric motors, it is desirable, if not necessary, that the electrical components, i.e., the windings and their connections, be enclosed from the surrounding atmosphere. For example, fractional horsepower motors are used today in many domestic refrigerators to drive air circulating fans, and both to protect the motor itself and to avoid hazard, it is necessary that the motor windings be effectively separated from the surrounding atmosphere. Considerable condensation of moisture occurs within the refrigerator and since the condensate may drip or otherwise come into contact with the motor, a waterproof casing should be provided for the windings to prevent shorting or grounding by the condensate. Also, since any electrical winding is liable to failure over an extended period of time, refrigerators being used upwards of 15 to 20 years, the motor windings should be encased to prevent the escape of molten copper if failure should occur after years of service. Obviously, if molten copper could escape into the refrigerator, a considerable fire and personal hazard would be created. The same considerations hold true for any flames or sparks occurring upon motor failure, which should also be prevented from escaping into the surrounding environment.

The solution heretofore generally used by fractional horsepower motor manufacturers for these applications where the electrical components of the motor must be separated from the surrounding atmosphere is to encase the motor completely with a metal enclosure. In other words, the motor housing surrounds the rotor and the stator with no openings whatsoever except for the output shaft. These motors are known as totally enclosed motors and they do result in acceptable protection of the windings and elimination of hazard upon winding failure. But they are quite expensive as compared to an open motor and in addition they have several inherent disadvantages. Their size and bulk is increased as compared to an open motor, which sometimes makes them more difficult to use where space is at a premium. Also, and probably most important, the normal ventilation system for open motors wherein the heat generated in the windings is dissipated to a stream of air passed through the motor cannot be used. With the lack of adequate ventilation, the motor temperature necessarily rises and consequently the life of the winding insulation is adversely effected. Also, the lubrication properties of the oil supplied to the shaft bearings are reduced due to the higher temperature of operation.

Accordingly, it is a principal object of my invention to provide a new and improved motor for use in applications where enclosed electrical components are desired, wherein only the windings are enclosed as contrasted to the entire motor.

It is another object of my invention to provide a new and improved motor wherein the windings are effectively protected from moisture and from the escape of molten copper and flame upon failure, but yet the motor is directly ventilated to the surrounding atmosphere and is not increased in size or bulk.

A further object of my invention is to provide a new and improved motor for use in applications requiring enclosed electrical components, which is cheaper to manufacture than a totally enclosed motor of equivalent output.

Briefly stated, in accordance with one aspect of my invention, I provide an electric motor including a rotor and a stator. The stator carries the energizing winding of the motor which is formed of a number of random wound and contiguous turns of metallic wire in the illustrated embodiment having an adherent coating of insulating material. This coating serves to insulate the various turns of the winding from each other and is selected to have a predictable melting or failure temperature. Both to protect the winding and to render it "fail safe," I enclose it within an imperforate and generally non-penetrating covering of protective material. This imperforate covering is also selected to have a predictable melting point, and it is so arranged that it is not affected by heat within the winding as readily as is the insulating coating on the wire itself. Thus, in the event of a failure in the winding, the wire coating is melted to accelerate a complete failure of the motor before the outer protective covering of the winding is affected. Thereby, the outer covering is effective to prevent the escape of molten copper and any accompanying sparks or flame, and the motor is suitable for use in applications requiring fail-safe electrical components without a complete metal housing for the motor being required. During normal operation of the motor, the imperforate outer covering for the winding is effective to prevent the entry of moisture into the winding and thereby aids in avoiding winding failure in the first place. This construction forms the subject matter of and is claimed in my Patent 3,196,297 previously mentioned.

Turning now to another aspect of my invention, the above described arrangement of the windings allows the elimination of the over-all motor casing so far as the protection of the winding is concerned. However, if the best advantage is to be made of this protected winding arrangement, the motor lubrication system must also be constructed so that there is no need for a metal casing surrounding the motor. In other words, the lubrication system should provide reliable lubrication for the shaft bearings under adverse moisture conditions without an over-all motor enclosure being required. Also, the system should be capable of providing bearing lubrication over a long period of years without reoiling, since the motors may be used on applications such as refrigerators where the purchaser expects maintenance free service for a period of 15 to 20 years. The elimination for the need for reoiling also will allow the motor to be positioned in locations which are relatively inaccessible once the refrigerator or other end product is completed.

Therefore, it is another object of my invention to provide an improved lubrication system which may be advantageously used with my protected winding arrangement to produce a moisture proof, fail-safe motor.

Another object of my invention is to provide a new and improved enclosed lubrication system for small dynamoelectric machines, which will provide reliable service for a long period of years without reoiling.

In carrying out this aspect of my invention, I provide a bearing assembly which includes a bearing member for journaling the rotor shaft. By one form of my invention, a pad of lubricant impregnated material is disposed adjacent the bearing member for feeding lubricant to the shaft and to make the system suitable for use in applications requiring enclosed components, a substantially imperforate casing is provided around the pad. The casing encloses the pad except for the region of contact between the bearing member and the pad and it both protects the pad and prevents the evaporation of lubricant therefrom. It is desirable that atmospheric pressure be maintained in the pad to produce an even flow of lubricant from the pad to the bearing over an extended period of time, and for that purpose the casing includes a breather opening in one wall thereof. Further, in the illustrated embodiment, at least one internally protruding rib is formed on the same wall of the casing to space the pad from that wall whereby any drops of lubricant forming on the exterior of the pad may freely move to another portion of the pad and be reabsorbed for future use on the bearing member. An internal flange formed around the breather opening prevents such drops from escaping through the opening, and the end result of the entire arrangement is that the bearing member is effectively lubricated for extended periods of time with no reoiling of the pad being required.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is an elevational view of a small electric motor which embodies my invention in one form thereof, the view being partially broken away to show details;

FIG. 2 is a side view, partially in section, of the motor of FIG. 1;

FIG. 3 is an enlarged sectional view taken along the line 3—3 of FIG. 1 and illustrating the terminal arrangement incorporated in the motor;

FIG. 4 is an enlarged fragmentary view illustrating one of the bearing assemblies utilized in the motor; and FIG. 5 is a cross sectional view taken on the line 5—5 of FIG. 1 and showing the stator yoke section and the energizing winding of the motor.

Referring now to the drawing, I have shown therein an electric motor 1 which embodies my invention in one form thereof. The motor 1 is of the shaded pole type and it includes a stator 2 and a rotor 3. The rotor 3 is positioned between a pair of oppositely disposed pole faces provided on the stator, one of the pole faces being shown at 4, and the rotor is activated during operation by means of the magnetic flux passing between these pole faces. Suitable shading coils are provided at the trailing ends of the stator pole faces to provide starting torque and to aid in producing running torque. For example, the shading coils for the pole face 4 may comprise a pair of copper rings such as are indicated at 5 and it will be understood that similar coils are mounted diametrically opposite on the other pole face.

The magnetic flux for exciting the rotor 3 is provided by an electrical winding or coil 6 which is mounted on a yoke section or winding leg 7 of the stator. As is best shown in FIG. 1, the winding leg 7 is positioned between and in tight engagement with depending legs 8 and 9 of the stator and these legs serve to complete the flux path between the winding legs and the pole faces.

As is best seen in FIGS. 2 and 5, both the winding leg or yoke section 7 and the main portion of the stator are formed of a plurality of stacked laminations of magnetic material. The winding leg 7 is formed separately from the rest of the stator and is pressed into position between the legs 8 and 9 after the coil 6 is wound thereon. The press fit between the winding leg 7 and the depending legs 8 and 9 is enough in itself to keep the winding leg in place with no additional securement being required. It will be understood that the rotor 3 is also formed of a plurality of stacked laminations of magnetic material with a squirrel cage winding of conductive material being provided in slots formed therein.

It will be noted from the drawing that the motor 1 does not include an overall protective metal housing or casing. Nonetheless, by my invention, the motor is so constructed and arranged that it is suitable for use in applications requiring enclosed electrical components. To this end, the winding 6 is arranged so that it is both fail-safe and moisture proof. Specifically, the winding 6 is provided with an outer protective covering 10 and this covering 10 is so selected and formed that it prevents the entry of moisture into the winding and also contains any sparks or flames which might occur upon failure of the winding.

Taking first the "fail-safe" feature of the invention, this depends upon a predetermined relationship between the wire of the winding 6 and the material of the outer protective covering 10. The wire of the winding 6 comprises metallic wire having adherent insulating coating and this insulating coating is effective to insulate various turns of the winding from each other. In other words, the winding 6 is formed of the type of wire known in the motor industry as "magnet wire." The type of magnet wire used in the winding is very important to my invention. Specifically, the magnet wire must be so selected that its insulation has a predictable melting or failure point in terms of temperature, which in my preferred embodiment is lower than the melting or failure point of the material forming the outer covering 10 of the winding. In my preferred embodiment, I utilize a magnet wire having a two layer insulating coating, the inner layer being formed of polyurethane and the outer coating being formed of nylon. The polyurethane inner coating gives a predictable melting point for the wire insulation between 165° C. to 225° C. and also renders it moisture resistant, while the outer nylon coating gives mechanical protection such as scrape resistance and crack resistance to the wire. A commercially available wire of this type which is suitable for use in my invention is the Nyleze wire produced by the Phelps Dodge Copper Products Corporation.

The outer covering 10 of the coil is also selected to a predictable melting or failure point, and in particular, it is selected and arranged so that it will not be affected immediately by an overtemperature condition within the coil 6. Thus, if a failure occurs within the coil, the heat created by the failure affects the insulation of the magnet wire before it affects the outer covering 10. In other words, it accelerates the failure of the magnet wire without causing the outer covering 10 to fail. Thus, what may be initially only a small ground or short within the winding will rapidly increase to a fault of major magnitude. This fault as it increases in magnitude will, of course, draw increasing current through the line and will blow the line fuse or trip the line breaker or generate enough local heat to cause the wire to sever before the outer coating 10 is melted.

Before turning to the material and formation of the covering 10, it will be noted that in the selection of the magnet wire not only is the melting point of the wire insulation of importance but also the products formed by the melting or decomposition are important. In particular, the insulation of magnet wire should be selected so that it will give a minimum of gases upon melting. This will, of course, avoid internal pressures in the winding such as might rupture the outer covering 10. Also, what gases are given off should not be combustible or toxic. This is, of course, desirable to avoid both a fire and a personnel hazard upon the winding failure.

Referring now to the outer protective covering 10, this covering must not melt or fail upon an over-heating condition in the winding as quickly as the insulating coating on the magnet wire. Since the covering 10 is exterior to the winding, the magnet wire of the winding is necessarily heated more quickly than the covering when excess heating occurs in the winding. In other words, there is an inherent thermal time delay in the heating of the covering which means that its temperature rise will lag behind the internal temperature of the winding. Thus, even if the material of the outer covering does not have a higher absolute melting or failure point than the insulating coating on the magnet wire, the wire coating will be heated more quickly and will fail before the covering 10 in the event of winding failure.

In the illustrated embodiment, to insure further that the covering 10 will not melt as quickly as the insulation on the magnet wire, I have used a resinous material for the covering which itself has a higher absolute melting point than the magnet wire insulation. Specifically, in the illustrated embodiment, the covering 10 is formed of a thermosetting resin and in particular of an epoxy resin. This resin of the illustrated embodiment is so selected that it will not melt or fail until an internal hot spot temperature of about 400° C. is reached in the winding 6. With this 400° C. hot spot temperature required within the winding before the covering will melt, it will not fail as soon as the magnet wire and thereby it will contain any flame or combustible products resulting from a failure within the winding long enough for the line fuse of the motor to be blown or for the wire to break apart within the winding. A material which I have used for forming the coil is the Corvel Epoxy EXP-24A which is available from National Polymer Products, Inc. Depending upon degree of cure, this material has an absolute melting point of 250° C. or higher for the transient heat conditions which are encountered during motor failure.

The resinous coating 10 is formed around the coil 6 after the coil itself is wound on the winding leg or yoke section 7. The resin for forming the coating is deposited over the coil and then is cured in place so as to form an imperforate covering or casing over the coil in intimate contact therewith. Although the resin may be deposited and cured in any suitable manner, one way in which it may be done is to dip the coil in a fluidized bed of the uncured resin powder while at the same time passing a D.-C. current through the winding. The powder, as it is deposited on the coil by the fluidized bed, is melted by the heat in the coil itself so that it adheres to the coil, whereby after curing in an oven it forms a uniform imperforate and void free covering over the coil in intimate contact therewith.

As mentioned above, the covering 10 must be such that it will not allow the escape of flame or sparks from the winding or coil 6 upon failure and also for protection of the motor, it should be water tight. Since the covering is imperforate, it will not allow water or flame to pass through it, but in addition, it must make a water impervious and flame resistant joint to the winding leg 7 at the end of the coil. In my preferred embodiment, this is accomplished by bonding the covering 10 to the ground insulation on the winding leg itself. As is best shown in FIG. 5, the winding leg 7 includes a covering of insulating material 11 over the entire area on which the coil 6 is wound. This layer of integral insulation may be placed on the winding leg in any suitable manner as by a fluidized bed process and in the illustrated embodiment, it comprises a mica filled epoxy resin with a suitable hardener such as an amine hardener. In particular, this integral insulation is chosen to be compatible with the material of the covering 10 so that the covering will bond to it when it is formed over the coil 6. This bond which may be automatically formed by the resinous material itself as the covering 10 is formed, is effective to prevent water from leaking into the coil along the winding leg and to prevent the escape of flame upon any failure of the coil.

In order to provide complete moisture proofing and fail-safe characteristics, the lead-in connections to the winding or coil 6 should also be flame and moisture proof. Before turning to these lead-in connections, one additional feature of the coil itself should be noted. Referring now to FIG. 1, it will be noted that the coil is random wound instead of being form wound. In other words, instead of the magnet wire being wound on the yoke section or winding leg 7 in uniform layers to form the coil, it is wound on in a random fashion with no effort being made to lay the wire in a precise pattern. This results in many cross overs and points of contact between the various turns of the winding and it also results in more pressure at the points of contact than occurs in a form wound coil. Also, there is a greater potential or voltage difference between many of the adjacent and crossed turns than there is between adjacent turns on a precision wound winding. All of this, the cross overs, the higher pressure, and the higher potential between turns, is of aid in accelerating an initial failure in the winding before the outer covering 10 can melt. In other words, if a small failure should occur within the winding, the numerous contacts between the turns of the winding and the pressure between the turns tend to cause a quicker failure of the coil and thereby aid in the interruption of the line current by the line fuse before the covering 10 can fail. It will be understood that the acceleration of any failure within the winding is a very important feature of this invention since for the motor to fail safe, the line fuse must be opened or the wire of the winding ruptured (melted apart) before the outer covering 10 can be melted. The covering 10 will maintain flame, sparks and any molten metal within the winding 6 provided the failure occurs quickly, but, obviously, if the failure were to occur over a long period, the covering itself might fail. Thus, it is important to this aspect of my invention that the magnet wire of the winding have a predictable melting or failure point appreciably lower than the internal temperature of the winding at which the material of the outer covering 10 will melt, and it is also very desirable that the coil be random wound to aid in accelerating the failure.

It is also important that the lead-in connections for the winding 6 be such that water cannot get into the winding through them. In addition, they should not provide a path for flame or sparks to escape from the winding in the event of failure. The manner in which this type of lead-in connection is obtained in the illustrated embodiment is best shown in FIGS. 1 and 3. As is there shown, a pair of identical slots 12 are provided at the opposite ends of the winding leg or yoke section 7 for accommodating the lead-in wires. The walls of these slots are covered by the integral insulation layer 11 of the winding leg and the lead-in conductors 13 and 14 for the winding are extended into the respective slots. As is shown in FIG. 3 for the conductor 13, the ends of the lead-in conductors are bared within the slots 12 and the opposite ends of the magnet wire forming the coil 6 are brought into the respective slots and connected to the bared ends of the lead-in conductors. The connection 15 between conductor 13 and the one end of the winding 6 is shown in FIG. 3, and it will be understood that an identical connection is made in the other slot 12 between the conductor 14 and the other end of the winding.

After the connections are made between the lead-in conductors and the ends of the winding 6, the magnet wire ends having been bared of insulation for that purpose, the slots 12 are then filled with a suitable insulating filler material. Any suitable flame and moisture resistant material may be used and in the illustrated embodiment an epoxy resin is employed. Then, when the outer covering 10 of the coil 6 is formed, the ends of the covering are extended over the opposite ends of the slots 12 so as to flow around the lead-in conductor on one side and around the wire extending into the winding on the other end. The extension 16 of the covering 10 over the lead-in conductor 13 may be readily seen in FIGS. 1 and 3 and it will be understood that in the illustrated embodiment, an identical arrangement is used for the other lead-in conductor 14 at the other end of the winding leg. With the covering 10 extending around and bonded to both ends of the winding and the lead-in conductors, thereby the lead-in connections are both moisture proof and flame proof.

To insure the effectiveness of the joint, however, the lead wire insulation itself must be water impervious and must be compatible with the material forming the covering 10. In other words, the lead-in wire insulation must be such that the covering material can readily be bound to it and also its constituents must be such that it will not attack the covering 10, or vice versa, over a long period of time.

It will thus be seen that the covering 10 is effective to prevent the entry of moisture into the winding during operation and is also effective to maintain any flame, etc., within the winding in the event of failure since, due to characteristics of the magnet wire insulation, the failure will be accelerated so as to open the line fuse or the winding itself before the covering 10 melts. It will, of course, be obvious that the motor is preferably used with a suitable fuse or breaker in the energizing circuit. But since the winding will itself melt open before the covering 10 fails, the motor can be used without an individual fuse, for example, in packaged air conditioning units where only one relatively large fuse or breaker is included to protect all the components.

The outer covering 10 also prevents the entry of water into the winding, and preferably this water resistant characteristic is aided by the provision of a layer of varnish over the coil after the covering 10 is formed. In other words, the winding leg and coil are preferably given a varnish treatment and the resultant varnish layer assists in keeping moisture out of the winding.

My improved arrangement of the motor winding thus allows the elimination of an overall metallic motor casing insofar as the protection of the windings is concerned. However, if the expense and other disadvantages of a motor casing are to be avoided, the bearing and lubrication system of the motor must also be constructed so that there is no need for an overall housing. In addition, the lubrication system should provide for reliable bearing life over a long period of years with a minimum of maintenance, i.e., re-oiling, being required. To this end, I have provided a new and improved bearing assembly in the motor 1 which is particularly advantageous for use with my winding arrangement although it does have utility independent of the winding arrangement, and vice versa.

Referring now to FIGS. 1, 2 and 4, it will be noted that the rotor 3 is mounted on an output shaft 17. This shaft is supported at opposite sides of the rotor by identical bearing assemblies 18, the only difference between the two assemblies being that the right hand one (as viewed in FIG. 2) includes an open end cap instead of a closed end cap to accommodate the output shaft extension. Each of the bearing assemblies 18 includes a central bearing member 19 formed of relatively porous sintered material, and these members 19 journal the shaft 17 for rotation. The respective bearing members 19 are supported from the stator 2 by means of suitable end brackets or frame members 20 and 21 as best shown in FIG. 2. The end brackets are generally U-shaped in configuration with the legs of the U being attached to the stator and with the bight or center portion of the U supporting the associated bearing 19. In particular, the bearings extend through suitable openings 22 provided at the center of the brackets and are staked thereto as is best shown at 23. This staking is done under considerable pressure and forms a permanent mount of the bearing 19 on its respective end bracket. The end brackets may be attached to the stator in any suitable means as by cementing.

In order to lubricate the bearings 19, each of the bearing assemblies 18 includes a suitable lubricant reservoir or pad 24 which is impregnated with a suitable grade of lubricating oil. In the illustrated embodiment, the lubricant pads 24 are disposed around the bearings 19 and in each assembly a region of contact 25 is provided between the pad and the bearing around the entire peripheral surface of the bearing. During operation, the lubricant in the pad slowly seeps from the pad through this region of contact into the bearing 19 and thence through the shaft 17 to lubricate it. It will be understood that this seepage occurs at a very slow rate, for example, at a rate in the neighborhood of one-tenth of a cubic centimeter per thousand hours of operation.

To protect the reservoir pad and to prevent the evaporation of lubricant, it is enclosed in each of the assemblies 18 within a substantially imperforate casing or housing 26 which is formed of a main dish shaped casing member 27 and a cooperating cover 28. The casing 27 and the cover 28 may be attached together by any suitable means after the pad 24 is placed therein but preferably they are cemented together as indicated at 28a, the cementing material extending all the way around the cover to provide a good seal. It will be noted that the inner end of the cover member 28 rests on and is cemented to a stepped end cap 29, or 29a in the case of the left hand assembly. The only difference between the end cap 29 and the end cap 29a is that the end cap 29 includes an opening accommodating the shaft 17 whereas the end cap 29a is closed. As will now be explained, these end caps 29 and 29a serve as the main mounting members for the motor, they being arranged as illustrated in FIG. 2 to accommodate resilient mounting rings 30 which may be attached to any suitable support.

So that they may effectively support the motor, the inner ends of the end caps 29 and 29a are extended over the outboard ends of their respective bearings 19 as is best indicated at 31 in FIG. 4. They thus provide a firm support for the bearings from the mounting rings 30. The bearings 19 in turn support both the rotor shaft and the stator, the rotor shaft being carried directly and the stator being mounted thereon by the brackets 20 and 22. To provide proper spacing, the end caps 29 and 29a are stepped as indicated at 32 and a spacer 33 is positioned between the end of the respective bearing and the step so as to obtain the proper positioning of the end cap relative to the bearing. In other words, the end of each end cap must fit over the outer end of its associated bearing in order to support the motor, but must not fit so far over the bearing as to interfere with the flow of lubricant from the pad 24 to the bearing. This mounting arrangement is very desirable because it results in the motor being supported as close as possible to the shaft center line. Thereby a high degree of vibration isolation is obtained with a minimum of parts.

Each of the housings 26 comprising the main casing member 27, the cover member 28 and the bearing cap 29 or 29a forms a generally imperforate structure around the associated lubricant reservoir pad 24. This, of course, prevents moisture from seeping into the pad and also prevents evaporation of the lubricant from the pad. However, it is desirable for effective oiling of the associated bearing for long periods of time that an opening be provided in the casing so that the same air pressure is maintained inside the casing as outside. If no opening were provided in the casing, obviously either a pressure build up or a pressure reduction could occur within the housing depending upon the ambient temperature and the temperature of operation, which might cause the oil to seep through the bearing either faster or slower than is desired. In other words, the effective oiling of the bearing might be interfered with over a period of time. Thereby, I have provided a breather opening 34 in the cover member 28 of each bearing assembly. This breather opening allows air to enter and leave the interior of the casing and thereby keeps the air pressure within the casing the same as that of the surrounding environment. Also formed on the cover member 28, are a plurality of longitudinally extending inwardly protruding ribs 35. As is best shown in FIG. 4, these ribs 35 space the lubricant pad 34 slightly from the cover member. In other words, they cause a space 36 to be left within the casing 26 between the lubricant pad 24 and the cover. This space is desirable since drops or beads of oil may very well occur on the exterior of the pad during the initial period of its operation. In other words, particularly when the motor is first put into service, drops of oil may appear on the surface of the saturated pad as the motor heats up. Also, drops of oil may be carried out of the pad by bubbles of air leaving the pad due to pressure changes. The space 36 between the cover member and the pad accommodates these drops of oil and allows them to run from an oversaturated portion of the pad to a drier portion of the pad where they are reabsorbed. Thus, no oil is lost during service, but rather, even though the drops appear, the oil is retained for future use.

With the possibility of oil drops appearing in the space 36, it is, of course, very desirable that these drops not be allowed to escape through the breather opening 34. Thus, for this reason, an inwardly extending flange 37 is provided around the breather opening, extending into the space 36. This flange 37 is high enough that it extends almost to the surface of the pad 24, and thereby any oil drops leaking from the pad in the space 36 will run down the pad and cannot escape through the breather opening 34.

It will be noted that in each of the assemblies 18, the bearing housing 26 is arranged to prevent leakage of the oil at the ends of the bearing itself. At the outboard end of the bearing, the end caps tend to prevent the loss of oil from the bearing. The end cap 29a is, of course, closed and the end cap 29, although open to allow the escape of the shaft, is so extended that oil seeping out the outboard end of the associated bearing 19 merely falls onto the shaft rather than escaping from the motor. The cover 28 is firmly cemented to the flange 38 of the bearing cap as indicated at 39 so that an oil tight seal is provided preventing leakage between the cover and the end cap. At the inboard end of the respective bearings, the brackets are staked firmly thereto so that very little oil can pass by them and also the members 27 of the casing are cemented firmly to the bracket as indicated at 40 so that oil cannot escape between the brackets and the bearing assembly casings. Thereby, very little if any of the lubricant can escape at the inboard or the outboard end of the bearings.

Preferably, and as shown, a circular rib 41 is formed on the casing member 27 to prevent the cement 38 from leaking into the inboard end of the bearing during assembly.

Thus, it will be seen that I have provided a bearing assembly which does not require an overall casing for the motor but yet is effective to provide reliable service over an extended period of years with no reoiling or other maintenance being required. In fact, with the lubricant pad 24 of the assembly being completely protected from the surrounding atmosphere except for the one breather opening, the bearing assemblies will operate reliably in extremely moist atmospheres.

Considering all of the above, it will be seen that I have provided a new and improved motor which may be used for applications requiring enclosed electrical components but yet does not require an overall motor casing or housing. With the motor being open to the surrounding atmosphere it, of course, ventilates itself and so that the heat generated in the windings is readily dissipated. Therefore, the adverse temperature conditions affecting the insulation life and the lubricant properties in the ordinary totally enclosed motor are not present in my improved motor, and also the motor is much smaller in size than a comparable totally enclosed motor of the same rating. In addition, due to the elimination of the motor shell and other special parts the motor is much less expensive to manufacture than a totally enclosed motor of equivalent rating.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a dynamoelectric machine having a rotor and a shaft mounting said rotor, a bearing assembly for mounting said shaft comprising a bearing member journaling said shaft, a pad of lubricant impregnated material disposed adjacent said bearing member for feeding lubricant thereto, and a substantially imperforate casing enclosing said pad except for the region of contact between said bearing member and said pad, one of the walls of said casing having a breather opening for maintaining atmospheric pressure around said pad, at least one inwardly protruding rib for spacing said pad from said one wall to provide a passageway therebetween for enabling any drops of lubricant on the adjacent surface of an oversaturated portion of said pad to flow to a less saturated portion and be reabsorbed and to allow the free passage of air to and from said breather opening, and an interior flange surrounding said breather opening to prevent the escape of lubricant through said opening.

2. In a dynamoelectric machine having a rotor, a shaft mounting said rotor, and a stator, a bearing assembly for mounting said shaft comprising a bearing member journaling said shaft, frame means mounting said bearing member on said stator, a pad of lubricant impregnated material disposed adjacent said bearing member for feeding lubricant thereto, and a substantially imperforate casing enclosing said pad except for the region of contact between said bearing member and said pad, said casing including an end cap contacting and enclosing the outboard end of said bearing for providing support thereto and extending outwardly around said shaft to form a mounting member for said machine located closely adjacent to said shaft.

3. In an electric motor having a rotor, a stator and a shaft mounting said rotor, a pair of similar bearing assemblies disposed respectively on the opposite sides of said rotor for mounting said shaft, said bearing assemblies each comprising a porous bearing member journaling said shaft, frame means mounting said bearing member on said stator, a pad of lubricant absorbing material disposed around and contacting at least a portion of the peripheral surface of said bearing member, and a substantially imperforate casing enclosing said pad except for the region of contact between said bearing member and said pad, one of the walls of said casing having a breather opening for maintaining atmospheric pressure on said pad, at least one inwardly protruding rib for spacing said pad from said one wall to provide a passageway therebetween for enabling any drops of lubricant on the adjacent surface of an oversaturated portion of said pad to flow to a less saturated portion and be reabsorbed and to allow free passage of air to and from said breather opening, and an interior flange surrounding said breather opening to prevent the escape of lubricant through said opening, and said casing including an end cap contacting and enclosing the outboard end of said bearing for providing support thereto and extending outwardly therefrom around said shaft.

4. In a dynamoelectric machine having a rotor, a shaft mounting said rotor, and a stator, a bearing assembly comprising; an end frame means disposed at one side of the stator; a sleeve bearing for journalling the shaft having one end secured to said frame means; a generally imperforate separate casing mounted to said frame means and enclosing said bearing; lubricant impregnated material disposed adjacent said bearing within said casing for storing and feeding lubricant to the journal of the shaft; said casing comprising first and second housing members formed of sheet material having adjacent portions and being secured firmly together; and means sealing said housing members at the adjacent portions to prevent the escape of lubricant therebetween; at least one of said housing members including a breather opening formed therethrough in free communication between the lubricant impregnated material and externally of said casing, said breather opening being surrounded by an interior flange to prevent the escape of lubricant therethrough and being positioned radially outward of said bearing in the vicinity of the lubricant material for maintaining atmospheric pressure on the lubricant material within said casing.

5. The bearing assembly of claim 4 in which said bearing has an outboard end, and an end cup contacting and enclosing the outboard bearing end for providing support thereto, said end cap extending outwardly around the shaft to form a mounting member for the machine located closely adjacent to the shaft.

6. In a dynamoelectric machine having a rotor, a shaft mounting said rotor, and a stator, a bearing assembly for rotatably supporting one end of the shaft and the stator for relative rotation comprising an end frame means disposed at one side of the stator, a sleeve bearing for journalling the shaft having one end secured to said frame means and the other end projecting generally away from said frame means and the stator, lubricant impregnated material disposed adjacent said other bearing and for storing and feeding lubricant to the journal of the shaft, and a generally imperforate separate casing mounted to said frame means on the side facing away from the stator and enclosing said bearing and lubricant impregnated material, said casing comprising first and second housing members each formed of sheet material secured firmly together, means sealing the two housing members to prevent the escape of lubricant therebetween, one of said housing members having a breather opening therethrough positioned radially outward of said bearing in the vicinity of said lubricant material for maintaining atmospheric pressure within said casing, and an interior flange surrounding said breather opening to prevent escape of lubricant therethrough.

References Cited by the Examiner

UNITED STATES PATENTS

| | | | |
|---|---|---|---|
| 2,137,434 | 11/1938 | Wood. | |
| 2,193,713 | 3/1940 | Cole | 310—90 |
| 2,245,433 | 6/1941 | Delmonte | 310—90 |
| 2,462,172 | 2/1949 | Esarey | 310—90 |
| 2,508,137 | 5/1950 | Bender | 310—90 |
| 2,754,579 | 6/1956 | Shewmon | 310—90 |
| 2,845,552 | 6/1958 | Robinson | 310—90 |
| 2,945,729 | 7/1960 | Mitchell | 310—90 |
| 2,959,696 | 11/1960 | Tupper et al. | 310—90 |
| 3,002,261 | 10/1961 | Avila | 310—90 |

FOREIGN PATENTS 590,885  10/1934  Germany.

MAX L. LEVY, *Primary Examiner.*

ORIS L. RADER, MILTON O. HIRSHFIELD,
*Examiners.*

J. W. GIBBS, *Assistant Examiner.*